US011599185B2

(12) United States Patent
Kawa et al.

(10) Patent No.: US 11,599,185 B2
(45) Date of Patent: Mar. 7, 2023

(54) INTERNET OF THINGS (IOT) POWER AND PERFORMANCE MANAGEMENT TECHNIQUE AND CIRCUIT METHODOLOGY

(71) Applicant: Synopsys, Inc., Mountain View, CA (US)

(72) Inventors: Jamil Kawa, Campbell, CA (US); Thu Nguyen, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 779 days.

(21) Appl. No.: 14/806,502

(22) Filed: Jul. 22, 2015

(65) Prior Publication Data

US 2017/0024003 A1  Jan. 26, 2017

(51) Int. Cl.
*G06F 1/3296* (2019.01)
*G06F 1/3234* (2019.01)
*G06F 1/324* (2019.01)

(52) U.S. Cl.
CPC .......... *G06F 1/3296* (2013.01); *G06F 1/324* (2013.01); *G06F 1/3275* (2013.01); *Y02D 10/00* (2018.01)

(58) Field of Classification Search
CPC .................................................. G06F 1/3296
See application file for complete search history.

(56) References Cited

U.S. PATENT DOCUMENTS 6,314,041 B1    11/2001  Frey
6,341,087 B1 *  1/2002   Kunikiyo .............. G11C 11/412
                                                    365/189.09
6,448,818 B1    9/2002   Fletcher
6,933,744 B2    8/2005   Das et al.
7,391,232 B1    6/2008   Bose et al.
(Continued)

FOREIGN PATENT DOCUMENTS

CN    1301430 A   *  6/2001  ......... H03K 19/0016
EP    2387156 A2     11/2011

OTHER PUBLICATIONS

Infineon Technologies AG, Machine Translation of CN1301430A: Circuit for reducing leaking current, Jun. 2001 (Year: 2001).*
(Continued)

*Primary Examiner* — Danny Chan
*Assistant Examiner* — Eric Chang
(74) *Attorney, Agent, or Firm* — Bever, Hoffman & Harms, LLP

(57) ABSTRACT

Energy consumption is reduced within an Internet of Things (IoT) device, without degrading operating performance of the corresponding internal circuitry. A first internal supply voltage (VDDa) used to supply the internal circuitry is reduced from a VDD supply voltage to a lower voltage during an idle state, thereby reducing leakage currents in the internal circuitry. The first internal supply voltage (VDDa) may be reduced to a voltage that is one threshold voltage (Vtp) lower than the VDD supply voltage. A second internal supply voltage (VSSa) used to supply the internal circuitry is increased from the VSS supply voltage to a voltage higher than the VSS supply voltage during the idle state, thereby further reducing leakage currents in the internal circuitry. The second internal supply voltage (VSSa) may be increased to a voltage that is one threshold voltage (Vtn) higher than the VSS supply voltage.

14 Claims, 2 Drawing Sheets

(56) References Cited

U.S. PATENT DOCUMENTS

| | | | | |
|---|---|---|---|---|
| 7,920,409 | B1* | 4/2011 | Clark | G11C 11/412 |
| | | | | 365/189.16 |
| 8,699,291 | B1* | 4/2014 | Ch'ng | G11C 5/147 |
| | | | | 365/191 |
| 2002/0167350 | A1* | 11/2002 | Sato | H03K 17/145 |
| | | | | 327/513 |
| 2002/0174153 | A1 | 11/2002 | O'toole et al. | |
| 2004/0113657 | A1 | 6/2004 | Alon et al. | |
| 2005/0184758 | A1 | 8/2005 | Hoberman et al. | |
| 2006/0050590 | A1 | 3/2006 | Nautiyal et al. | |
| 2008/0284504 | A1* | 11/2008 | Hirota | H03K 19/0016 |
| | | | | 327/544 |
| 2010/0149884 | A1 | 6/2010 | Kumar | |
| 2014/0013131 | A1* | 1/2014 | Bansal | G06F 1/26 |
| | | | | 713/320 |

OTHER PUBLICATIONS

Shedge; A CMOS Sourse Follower and Super SOurse Follower. Proc. of Int. Conf. on Advancers in Electrical & Electronics 2012.

* cited by examiner

INTERNET OF THINGS (IOT) POWER AND PERFORMANCE MANAGEMENT TECHNIQUE AND CIRCUIT METHODOLOGY

FIELD OF THE INVENTION

The present invention relates to a method and structure for saving energy in a battery powered electronic device, without degrading the operating performance of the electronic device.

RELATED ART

The Internet of Things (IoT) refers generally to a network of physical objects (or "applications") embedded with electronic circuitry, software, and sensors. These physical objects can be sensed and controlled remotely using an existing network. Many IoT applications rely on battery power. In such applications, battery life is critical. Idle time is typically very high (e.g., as high as 97%) in IoT applications. It is therefore desirable to minimize leakage currents within the IoT application during idle periods (because such leakage currents correspond with substantial energy loss, thereby draining the battery). One method for minimizing leakage currents is to reduce the nominal VDD supply voltage used for operating the IoT application. However, reducing the nominal VDD supply voltage results in poor circuit performance during non-idle operating conditions. More specifically, reducing the nominal VDD supply voltage results in a lower operating frequency (because operations take longer to resolve when using a lower voltage), which leads to longer idle time, more total energy consumed, and a shorter battery life. It is a challenge to reach an acceptable compromise between energy consumption and operating performance in a typical IoT application.

SUMMARY

Accordingly, an improved method and apparatus is provided to reduce energy consumption within an IoT application, without degrading operating performance of the corresponding internal circuitry. In accordance with one embodiment, a first internal supply voltage (VDDa) used to supply the internal circuitry is reduced from the VDD supply voltage to a voltage lower than the VDD supply voltage during an idle state of the IoT application, thereby reducing leakage currents in the internal circuitry during the idle state. In one embodiment, the first internal supply voltage (VDDa) is reduced to a voltage that is one threshold voltage (Vtp) lower than the VDD supply voltage.

In addition, a second internal supply voltage (VSSa) used to supply the internal circuitry is increased from the VSS supply voltage to a voltage higher than the VSS supply voltage during the idle state, thereby further reducing leakage current in the internal circuitry during the idle state. In one embodiment, the second internal supply voltage (VSSa) is increased to a voltage that is one threshold voltage (Vtn) higher than the VSS supply voltage.

In accordance with another embodiment, body regions of transistors within the internal circuitry are reverse biased during the idle state to further reduce leakage currents within the internal circuitry. More specifically, p-type body regions of p-channel transistors of the internal circuitry can be biased with the VDD supply voltage, and the n-type body regions of n-channel transistors within the internal circuitry can be biased with the VSS supply voltage during the idle state.

Upon leaving the idle state, the first internal supply voltage (VDDa) used to supply the internal circuitry is increased to the VDD supply voltage, and the second internal supply voltage (VSSa) used to supply the internal circuitry is decreased to the VSS supply voltage. This transition can be completed rapidly (fast wake up time) because the first internal supply voltage (VDDa) only need to increase by a transistor threshold voltage (Vtp), and the second internal supply voltage only needs to decrease by a transistor threshold voltage (Vtn).

In accordance with another embodiment, body regions of transistors within the internal circuitry are forward biased during the non-idle state to increase operating speeds of the internal circuitry. More specifically, p-type body regions of p-channel transistors of the internal circuitry can be biased with a voltage less than the VDD supply voltage, and the n-type body regions of n-channel transistors within the internal circuitry can be biased with a voltage greater than the VSS supply voltage during the non-idle state.

In the manner(s) described above, the IoT application advantageously exhibits energy savings during the idle state, without adversely effecting operating performance of the internal circuitry during the non-idle state. The present invention will be more fully understood in view of the following description and drawings.

DETAILED DESCRIPTION

Figure 1:
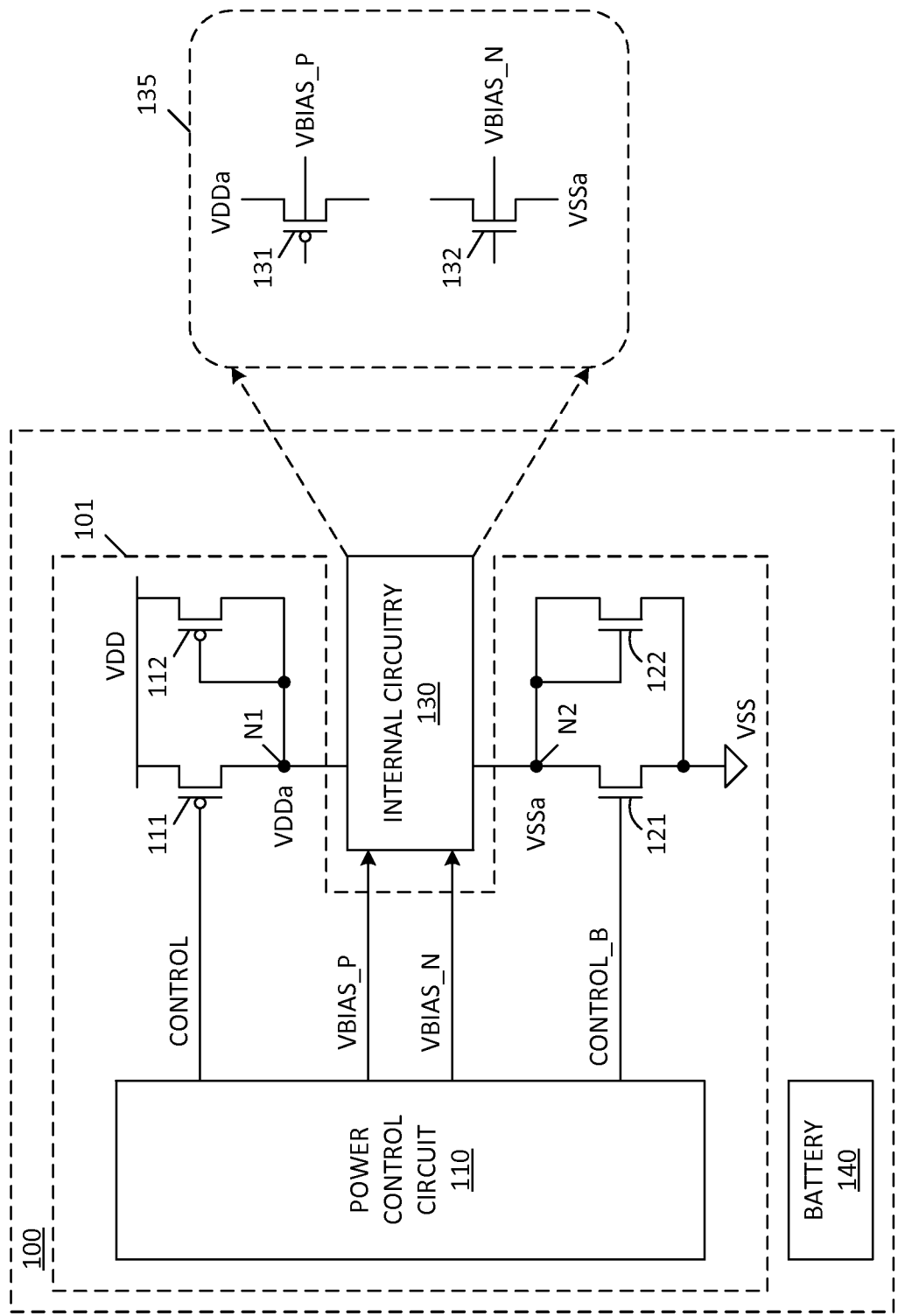
FIG. 1 is a circuit diagram of an energy saving circuit in accordance with one embodiment.

FIG. 1 is a circuit diagram of an IoT device/application 100, which includes energy saving circuit 101 in accordance with one embodiment of the present invention. As described in more detail below, IoT device 100 also includes internal circuitry 130 (which performs the desired functions of IoT device 100) and battery 140 (which powers IoT device 100). Energy saving circuit 101 includes power control circuit 110, p-channel transistors 111-112 and n-channel transistors 121-122. P-channel transistor 111 includes a source coupled to receive a nominal VDD supply voltage, a drain coupled to internal voltage supply node N1, and a gate coupled to receive a voltage control signal, CONTROL, from power control circuit 110. In the described examples, the nominal VDD supply voltage is provided by battery 140. The nominal VDD supply voltage is selected to provide desired performance characteristics for the internal circuitry 130 during normal (non-idle) operating conditions. For example, the nominal VDD supply voltage may be about 0.8 Volts in one embodiment (although other nominal voltages may be used in other embodiments). P-channel transistor 112 includes a source coupled to receive the nominal VDD supply voltage. The gate and the drain of p-channel transistor 112 are commonly coupled to internal voltage supply node N1. Thus, p-channel transistor 112 is connected in a source-follower configuration.

N-channel transistor 121 includes a source coupled to the supply voltage VSS, a drain coupled to the internal voltage supply node N2 and a gate coupled to receive a voltage control signal, CONTROL_B, from power control circuit 110. In the described examples, the supply voltage VSS is a ground supply voltage having a nominal voltage of 0 Volts (although other nominal voltages may be used in other embodiments). In the described examples, the voltage control signals CONTROL and CONTROL_B are complementary signals, wherein when one of these signals is high (VDD), the other one of these signals is low (VSS). N-channel transistor 122 includes a source coupled to receive the VSS supply voltage. The gate and drain of re-channel transistor 122 are commonly coupled to the internal voltage supply node N2. Thus, n-channel transistor 122 is connected in a source-follower configuration.

Internal voltage source nodes N1 and N2 are coupled to internal circuitry 130, whereby these nodes N1 and N2 provide power to internal circuitry 130. More specifically, internal voltage node N1 provides internal supply voltage VDDa to internal circuitry 130, and internal voltage node N2 provides internal supply voltage VSSa to internal circuitry 130. Internal circuitry 130 can include, for example, logic, sensor(s), memory, switches and/or any other circuitry required to implement the functionality to be provided by IoT device/application 100.

Power control circuit 110 also provides body bias control voltages VBIAS_P and VBIAS_N to internal circuitry 130. Call-out 135 illustrates an exemplary p-channel transistor 131 and an exemplary n-channel transistor 132 of internal circuitry 130. As illustrated, the p-type body region of p-channel transistor 131 (and all other p-channel transistors) within internal circuitry 130 is coupled to receive the body bias control voltage VBIAS_P from power control circuit 110. Similarly, the n-type body region of re-channel transistor 132 (and all other n-channel transistors) within internal circuitry 130 is coupled to receive the body bias control voltage VBIAS_N from power control circuit 110. Call-out 135 also generally illustrates that p-channel transistors within internal circuitry 130 (e.g., transistor 131) are powered by the internal supply voltage VDDa, and that n-channel transistors within internal circuitry 130 (e.g., transistor 132) are powered by the internal supply voltage VSSa.

Figure 2:
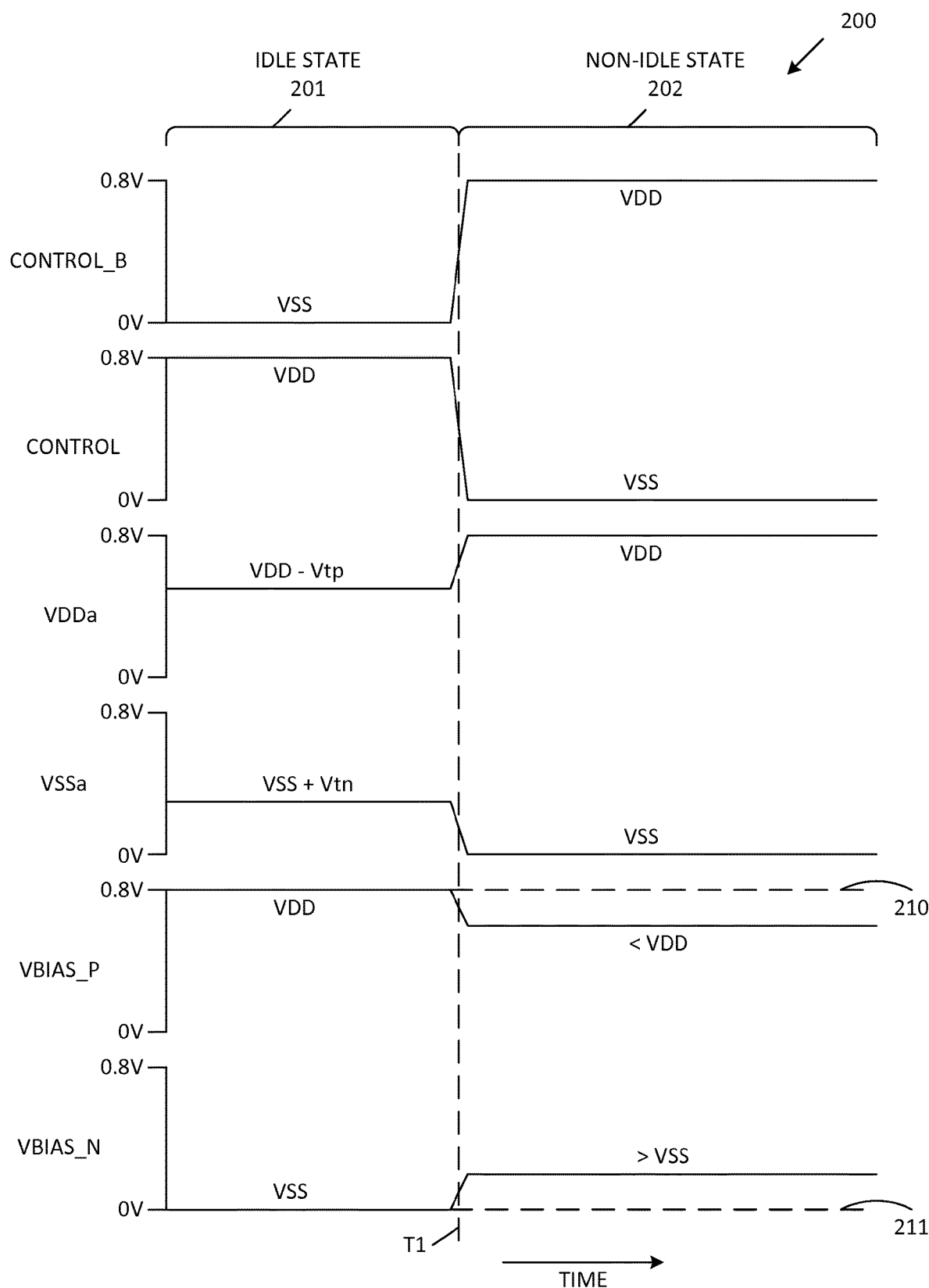
FIG. 2 is a waveform diagram illustrating a transition from an idle state to a non-idle state of the energy saving circuit of FIG. 1 in accordance with one embodiment.

The operation of energy saving circuit 101 will now be described. FIG. 2 is a waveform diagram 200 illustrating the idle and non-idle states of energy saving circuit 101. In idle state 201, the voltage control signals CONTROL and CONTROL_B are driven to the VDD supply voltage (e.g., 0.8 Volts) and the VSS supply voltage (e.g., 0 Volts), respectively. Under these conditions, p-channel transistor 111 and n-channel transistor 121 are turned off. During the idle state 201, p-channel transistor 112 is biased such that the gate-to-source voltage (and therefore the source-to-drain voltage) of this transistor 112 is equal to the threshold voltage (Vtp) of this transistor 112. That is, the internal supply voltage VDDa applied to the internal voltage node N1 is equal to the VDD supply voltage minus the threshold voltage Vtp of p-channel transistor 112.

Similarly, during the idle state 201, n-channel transistor 122 is biased such that the gate-to-source voltage (and therefore the source-to-drain voltage) of this transistor 122 is equal to the threshold voltage (Vtn) of this transistor 122. That is, the internal supply voltage VSSa applied to the internal voltage node N2 is equal to the VSS supply voltage plus the threshold voltage Vtn of n-channel transistor 122.

As a result, the effective voltage (VDDeff) applied across the elements of internal circuitry 130 during the idle state 201 is equal to (VDD–Vtp)–(VSS+Vtn), or VDD–Vtp–Vtn. Thus, the effective voltage applied across the various elements of internal circuitry 130 during the idle state 201 is less than the VDD supply voltage. Consequently, leakage currents within internal circuit 130 are reduced during the idle state 201, thereby resulting in energy savings and extending the battery life. In accordance with one example, the threshold voltages Vtp and Vtn may each be 0.3 Volts, such that the effective voltage VDDeff is about 0.2 Volts during the idle state 201. This results in a substantial energy savings within internal circuitry 130 during the idle state 201. The effective voltage VDDeff is selected to be high enough to maintain any data stored within various memory elements within the internal circuitry 130 during the idle state 201.

A typical semiconductor fabrication process offers transistors having many different available threshold voltages. That is, different (selectable) p-channel transistors of a process can exhibit different Vtp threshold voltages, and different (selectable) n-channel transistors of the process can exhibit different Vtn threshold voltages. In accordance with one embodiment, the threshold voltage Vtp of p-channel transistor 112 and the threshold voltage Vtn of re-channel transistor 122 are specifically selected to provide the desired effective voltage VDDeff. It is not necessary for the selected threshold voltages Vtp and Vtn to be equal. This approach advantageously provides a large amount of flexibility in selecting any particular effective voltage VDDeff for use during the idle state 201. In one embodiment, the threshold voltages Vtp and Vtn are selected to ensure that the effective voltage VDDeff (i.e., VDDa–VSSa) is large enough to ensure the retention of data within storage elements within internal circuitry 130, while also being small enough to provide energy savings in the idle state 201.

As described above, the body regions of the p-channel transistors within internal circuitry 130 (e.g., the body region of p-channel transistor 131) are coupled to receive the VBIAS_P voltage from power control circuit 110. Similarly, the body regions of the n-channel transistors within internal circuitry 130 (e.g., the body of n-channel transistor 132) are coupled to receive the VBIAS_N voltage from power control circuit 110. In accordance with one embodiment, power control circuit 110 controls the VBIAS_P and VBIAS_N voltages to have values equal to the VDD supply voltage and the VSS supply voltage, respectively, during the idle state 201. Under these conditions, the body regions of the transistors of internal circuitry 130 are reverse biased during the idle state 201, thereby further reducing leakage currents within the internal circuitry 130 during the idle state 201.

The effective voltage VDDeff can be modified in accordance with several variations of the above-described example. In accordance with one possible variation of the described example, internal voltage supply node N2 is connected directly to the VSS supply voltage (i.e., n-channel transistors 121 and 122 are eliminated from energy saving circuit 101). In this variation, the effective voltage VDDeff applied across the elements of internal circuitry 130 during the idle state 201 would be equal to (VDD–Vtp)–(VSS), or VDD–Vtp.

In accordance with another possible variation, internal voltage supply node N1 is connected directly to the VDD supply voltage (i.e., p-channel transistors 111 and 112 are eliminated from energy saving circuit 101). In this variation, the effective voltage VDDeff applied across the elements of internal circuitry 130 during the idle state 201 would be equal to (VDD)–(VSS+Vtn), or VDD–Vtn.

Note that it may be desirable to implement one of the two possible variations set forth above if the threshold voltages Vtp and/or Vtn are too large relative to the VDD supply voltage, thereby preventing the retention of stored data within internal circuitry 130 during the idle state 201. For example, if VDD=0.6 Volts, VSS=0 Volts, and Vtp=Vtn=0.25 Volts, then VDD−Vtp−Vtn (i.e., VDDeff) is less than 0 Volts, thereby preventing the proper retention of stored data within internal circuitry 130 during the idle state 201. However, if using p-channel transistors 111-112 (and eliminating n-channel transistors 121-122) then VDD−Vtp (i.e., VDDeff) is equal to 0.35 Volts, thereby enabling the proper retention of stored data within internal circuitry 130 during the idle state 201. Similar results can be obtained by using n-channel transistors 121-122 (and eliminating p-channel transistors 111-112).

The variations described above provide flexibility in selecting the effective voltage VDDeff to be applied to internal circuitry 130 during the idle state 201.

Returning to FIG. 2, at time T1, IoT device 100 transitions from the idle state 201 to the non-idle (active) state 202. To accomplish this transition, power control circuit 110 drives the voltage control signals CONTROL and CONTROL_B to the VSS supply voltage (e.g., 0 Volts) and the VDD supply voltage (e.g., 1 Volt), respectively. Under these conditions, p-channel transistor 111 and n-channel transistor 121 are turned on. As a result, the internal supply voltage VDDa on internal voltage supply node N1 is pulled up to the VDD supply voltage through p-channel transistor 111, and the internal supply voltage VSSa on internal voltage supply node N2 is pulled down to the VSS supply voltage through n-channel transistor 121. P-channel transistor 112 is turned off in response to the high voltage (VDD) on internal voltage node N1, and n-channel transistor 122 is turned off in response to the low voltage (VSS) on internal voltage node N2.

Advantageously, the above-described transition from the idle state 201 to the non-idle state 202 can occur rapidly, because the internal voltage supply node N1 only needs to charge (increase) from a voltage of (VDD−Vtp) to the VDD supply voltage. Similarly, the internal voltage supply node N2 only needs to discharge (decrease) from a voltage of (VSS+Vtn) to the VSS supply voltage.

In accordance with one embodiment, power control circuit 110 may drive the VBIAS_P voltage to a level below the VDD supply voltage at time T1, such that the body-to-source junctions of p-channel transistors (e.g., p-channel transistor 131) within internal circuitry 130 are forward biased, thereby advantageously increasing the operating speed of internal circuitry 130 during the non-idle state 202. Alternately, the VBIAS_P voltage may remain at the VDD supply voltage during the non-idle state 202 (as illustrated by dashed line 210 in FIG. 2).

Similarly, power control circuit 110 may drive the VBIAS_N voltage to a level above the VSS supply voltage at time T1, such that the body-to-source junctions of n-channel transistors (e.g., n-channel transistor 132) within internal circuitry 130 are forward biased, thereby advantageously increasing the operating speed of internal circuitry 130 during the non-idle state 202. Alternately, the VBIAS_N voltage may remain at the VSS supply voltage during the non-idle state 202 (as illustrated by dashed line 211 in FIG. 2).

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

We claim:

1. A battery powered electronic device comprising:
internal circuitry including p-channel transistors and n-channel transistors; and
power saving circuitry coupled to the internal circuitry, wherein the power saving circuitry is configured to apply a first effective voltage across the internal circuitry during a non-idle state of the internal circuitry, and apply a second effective voltage across the internal circuitry during an idle state of the internal circuitry, wherein the second effective voltage is less than the first effective voltage, and wherein the second effective voltage is selected to ensure that data stored by the internal circuitry is retained during the idle state,
wherein the power saving circuitry comprises:
a first transistor configured to turn on to couple a first nominal supply voltage terminal to a first internal supply node used to power the internal circuitry during the non-idle state;
a second transistor configured to couple the first nominal supply voltage terminal to the first internal supply node in a source-follower configuration during the idle state;
a third transistor configured to turn on to couple a second nominal supply voltage terminal to a second internal supply node used to power the internal circuitry during the non-idle state; and
a fourth transistor configured to couple the second nominal supply voltage terminal to the second internal supply node in a source-follower configuration during the idle state;
wherein the p-channel transistors of the internal circuitry have sources coupled to receive power from the first internal supply node and have body regions coupled to receive a first body bias control voltage, wherein the first body bias control voltage is controlled to forward bias the body-to-source junctions of the p-channel transistors during the non-idle state, and wherein the first body bias control voltage is changed to reverse bias the body regions of the p-channel transistors during the idle state; and
wherein the n-channel transistors of the internal circuitry have sources coupled to receive power from the second internal supply node and have body regions coupled to receive a second body bias control voltage, wherein the second body bias control voltage is controlled to forward bias the body-to-source junctions of the re-channel transistors during the non-idle state, and wherein the second body bias control voltage is changed to reverse bias the body regions of the n-channel transistors during the idle state.

2. A battery powered electronic device comprising:
internal circuitry including a plurality of transistors; and
power saving circuitry coupled to the internal circuitry, wherein the power saving circuitry is configured to apply a first effective voltage across the internal circuitry during a non-idle state of the internal circuitry, and apply a second effective voltage across the internal circuitry during an idle state of the internal circuitry, wherein the second effective voltage is less than the first effective voltage, and wherein the second effective voltage is selected to ensure that data stored by the internal circuitry is retained during the idle state,
wherein the power saving circuitry comprises:

a first transistor configured to turn on to couple a first nominal supply voltage terminal to a first internal supply node used to power the internal circuitry during the non-idle state; and a second transistor configured to couple the first nominal supply voltage terminal to the first internal supply node in a source-follower configuration during the idle state, wherein the plurality of transistors of the internal circuitry have sources coupled to receive power from the first internal supply node and have body regions coupled to receive a first body bias control voltage, wherein the first body bias control voltage is controlled to forward bias the body-to-source junctions of the plurality of transistors during the non-idle state, and wherein the first body bias control voltage is changed to reverse bias the body regions of the plurality of transistors during the idle state.

3. A method for operating a battery powered device comprising:

applying a first effective voltage across internal circuitry of the device during a non-idle state, wherein the first effective voltage is applied across the internal circuitry of the device by applying a first nominal supply voltage and a second nominal supply voltage across the internal circuitry of the device during the non-idle state; and applying a second effective voltage across the internal circuitry of the device during an idle state, wherein the second effective voltage is less than the first effective voltage, wherein the second effective voltage is selected to ensure that data stored by the internal circuitry is retained during the idle state, and wherein the second effective voltage is applied across the internal circuitry of the device by reducing the first nominal supply voltage and increasing the second nominal supply voltage during the idle state.

4. A battery powered device comprising:

internal circuitry;

a first internal voltage supply node coupled to the internal circuitry, wherein a first internal supply voltage applied to the first internal voltage supply node is applied to the internal circuitry;

means for increasing the first internal supply voltage applied to the first internal voltage supply node to a first nominal supply voltage from a voltage lower than the first nominal supply voltage during a transition from an idle state to a non-idle state of the battery powered device;

a second internal voltage supply node coupled to the internal circuitry, wherein a second internal supply voltage applied to the second internal voltage supply node is applied to the internal circuitry; and means for reducing the second internal supply voltage applied to the second internal voltage supply node to a second nominal supply voltage from a voltage higher than the second nominal supply voltage during the transition from the idle state to the non-idle state of the battery powered device.

5. The battery powered device of claim 4, wherein the first internal supply voltage is increased by a voltage equal to one transistor threshold voltage during the transition from the idle state to the non-idle state of the battery powered device.

6. The battery powered device of claim 5, wherein the second internal supply voltage is reduced by a voltage equal to one transistor threshold voltage during the transition from the idle state to the non-idle state of the battery powered device.

7. The battery powered device of claim 4, wherein the internal circuitry comprises one or more transistors each having a body region, the device further comprising means for reverse biasing the body regions of the one or more transistors during the idle state.

8. The battery powered device of claim 7, wherein the means for reverse biasing include means for biasing body regions of p-channel transistors of the one or more transistors with the first nominal supply voltage, and means for biasing body regions of n-channel transistors of the one or more transistors with the second nominal supply voltage.

9. The battery powered device of claim 7, further comprising means for forward biasing the body regions of the one or more transistors during the non-idle state.

10. A battery powered device comprising:

internal circuitry including p-channel transistors and n-channel transistors;

a first internal voltage supply node coupled to the internal circuitry, wherein the first internal voltage supply node supplies power to the internal circuitry during both an idle state and a non-idle state of the battery powered device;

a first transistor configured to turn on and apply a first supply voltage to the first internal voltage supply node during the non-idle state;

a second transistor having a first threshold voltage, wherein the second transistor is configured to apply a first idle supply voltage to the first internal voltage supply node during the idle state, wherein the first idle supply voltage differs from the first supply voltage by the first threshold voltage;

a second internal voltage supply node coupled to the internal circuitry, wherein the second internal voltage supply node supplies power to the internal circuitry during both the idle state and the non-idle state of the battery powered device;

a third transistor configured to apply a second supply voltage to the second internal voltage supply node during the non-idle state; and a fourth transistor having a second threshold voltage, wherein the fourth transistor is configured to apply a second idle supply voltage to the second internal voltage supply node during the idle state, wherein the second idle supply voltage differs from the second supply voltage by the second threshold voltage, wherein the p-channel transistors of the internal circuitry have sources coupled to receive power from the first internal supply node and have body regions coupled to receive a first body bias control voltage, wherein the first body bias control voltage is controlled to forward bias the body-to-source junctions of the p-channel transistors during the non-idle state, and wherein the first body bias control voltage is changed to reverse bias the body regions of the p-channel transistors during the idle state; and wherein the n-channel transistors of the internal circuitry have sources coupled to receive power from the second internal supply node and have body regions coupled to receive a second body bias control voltage, wherein the second body bias control voltage is controlled to forward bias the body-to-source junctions of the re-channel transistors during the non-idle state, and wherein the second body bias control voltage is changed to reverse bias the body regions of the n-channel transistors during the idle state.

11. The battery powered device of claim 10, wherein the first threshold voltage is different than the second threshold voltage.

12. The battery powered device of claim 10, wherein the first supply voltage is a positive voltage, and the first and second transistors are p-channel transistors.

13. The battery powered device of claim 10, wherein the first supply voltage is a ground supply voltage, and the first and second transistors are n-channel transistors.

14. The battery powered device of claim 10, wherein the second transistor is connected in a source-follower configuration between the first supply voltage and the first internal voltage supply node.

\* \* \* \* \*